US009146301B2

(12) United States Patent
Adcock et al.

(10) Patent No.: US 9,146,301 B2
(45) Date of Patent: Sep. 29, 2015

(54) LOCALIZATION USING MODULATED AMBIENT SOUNDS

(75) Inventors: John Adcock, San Francisco, CA (US); Donald Kimber, Foster City, CA (US); Ish Rishabh, Pasadena, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 702 days.

(21) Appl. No.: 13/358,234

(22) Filed: Jan. 25, 2012

(65) Prior Publication Data

US 2013/0188456 A1 Jul. 25, 2013

(51) Int. Cl.
*G01S 5/26* (2006.01)
*G01S 5/18* (2006.01)
*G01S 5/30* (2006.01)

(52) U.S. Cl.
CPC ... *G01S 5/26* (2013.01); *G01S 5/18* (2013.01); *G01S 5/30* (2013.01)

(58) Field of Classification Search
CPC ........... G01S 5/22; G01S 5/26; G01S 5/0252; G01S 7/539
USPC ............... 73/510, 596, 632; 315/291; 341/34; 342/22, 118; 367/76, 99, 118, 125, 367/127, 129, 138, 180; 701/3, 124; 702/150
See application file for complete search history.

(56) References Cited

U.S. PATENT DOCUMENTS

| 6,356,555 B1* | 3/2002 | Rakib et al. | 370/441 |
| 7,342,536 B2* | 3/2008 | Johnson | 342/442 |
| 7,843,379 B2* | 11/2010 | Menzer et al. | 342/118 |
| 2001/0053699 A1* | 12/2001 | McCrady et al. | 455/513 |
| 2003/0142587 A1* | 7/2003 | Zeitzew | 367/127 |
| 2005/0012802 A1* | 1/2005 | Silverbrook | 347/109 |
| 2005/0117454 A1* | 6/2005 | Millikin | 367/127 |
| 2007/0018890 A1* | 1/2007 | Kulyukin | 342/357.14 |
| 2007/0159924 A1* | 7/2007 | Vook et al. | 367/127 |
| 2008/0208538 A1* | 8/2008 | Visser et al. | 702/190 |
| 2009/0228240 A1* | 9/2009 | Makela et al. | 702/185 |
| 2010/0195445 A1* | 8/2010 | Calhoun | 367/127 |
| 2010/0322035 A1* | 12/2010 | Rhoads et al. | 367/118 |
| 2013/0272095 A1* | 10/2013 | Brown et al. | 367/118 |

OTHER PUBLICATIONS

Brandstein, Michael S., et al., "A Practical Time-Delay Estimator for Localizing Speech Sources with a Microphone Array", Jun. 20, 1995, pp. 1-24
Chen, Jingdong, et al., "Time Delay Estimation in Room Acoustic Environments: An Overview", EURASIP Journal on Applied Signal Processing, Jan. 2006, pp. 1-19, vol. 2006.
Chintalapudi, Krishna, et al., "Indoor Localization Without the Pain", Proceedings of the sixteenth annual international conference on Mobile computing and networking, MobiCom '10, 2010, pp. 173-184, New York, NY, USA, ACM.

(Continued)

*Primary Examiner* — Isam Alsomiri
*Assistant Examiner* — Amienatta M Ndure Jobe
(74) *Attorney, Agent, or Firm* — Sughrue Mion, PLLC

(57) ABSTRACT

Systems and methods for determining the location of a microphone by using sounds played from loudspeakers at known locations. Systems and methods may thereby require a minimal level of infrastructure, using sounds that would naturally be played in the environment. Systems and methods may thereby allow devices such as smart-phones, tablets, laptops or portable microphones to determine their location in indoor settings, where Global Positioning Satellite (GPS) systems may not work reliably.

14 Claims, 11 Drawing Sheets

(56) References Cited

OTHER PUBLICATIONS

Harter, Andy, et al., "The Anatomy of a Context-Aware Application", Proceedings of the 5th annual ACM/IEEE international conference on Mobile computing and networking, MobiCom '99, 1999, pp. 59-68, New York, NY, USA, ACM.

Hu, Jwu-Sheng, et al., "Simultaneous Localization of Mobile Robot and Multiple Sound Sources Using Microphone Array", Proceedings of the 2009 IEEE international conference on Robotics and Automation, ICRA'09, 2009, pp. 1-6, Piscataway, NJ, USA, IEEE Press.

Janson, Thomas, et al., "Self-Localization Application for iPhone using only Ambient Sound Signals", Proceedings of 2010 International Conference on Indoor Positioning and Indoor Navigation (IPIN), 2010, pp. 1-2.

Kawaji, Hisato, et al., "Image-based Indoor Positioning System: Fast Image Matching using Omnidirectional Panoramic Images", Proceedings of the 1st ACM international workshop on Multimodal pervasive video analysis, MPVA '10, 2010, pp. 1-4, New York, NY, USA, ACM.

Lopes, Cristina V., "Localization of Off-the-Shelf Mobile Devices Using Audible Sound: Architectures, Protocols and Performance Assessment", Mobile Computing and Communications Review, pp. 38-50, vol. 10, No. 2, Jan. 2005.

Ma, Wing-Kin, et al., "Tracking an Unknown Time-Varying Number of Speakers using TDOA Measurements: A Random Finite Set Approach", IEEE Transactions on Signal Processing, Sep. 2006, pp. 3291-3304, vol. 54, No. 9.

Martin, Eladio, et al., "Precise Indoor Localization Using Smart Phones", Proceedings of the international conference on Multimedia, MM '10, 2010, pp. 787-790, New York, NY, USA, ACM.

Miller, L. E., et al., "RFID-Assisted Indoor Localization and Communication for First Responders", The European Conference on Antennas and Propagation: EuCAP 2006, Oct. 2006, pp. 1-9, vol. 626 of ESA Special Publication.

Peng, Chunyi, et al., "BeepBeep: A High Accuracy Acoustic Ranging System using COTS Mobile Devices", Proceedings of the 5th international conference on Embedded networked sensor systems, SenSys '07, ACM, 2007, pp. 1-14.

Quiqley, Morgan, et al., "Sub-Meter Indoor Localization in Unmodified Environments with Inexpensive Sensors", IEEE/R91 International Conference on Intelligent Robots and Systems (IROS), Oct. 2010, pp. 2039-2046.

Varshavsky, Alex, et al., "GSM indoor localization", Pervasive and Mobile Computing, 2007, pp. 698-720, vol. 3.

\* cited by examiner

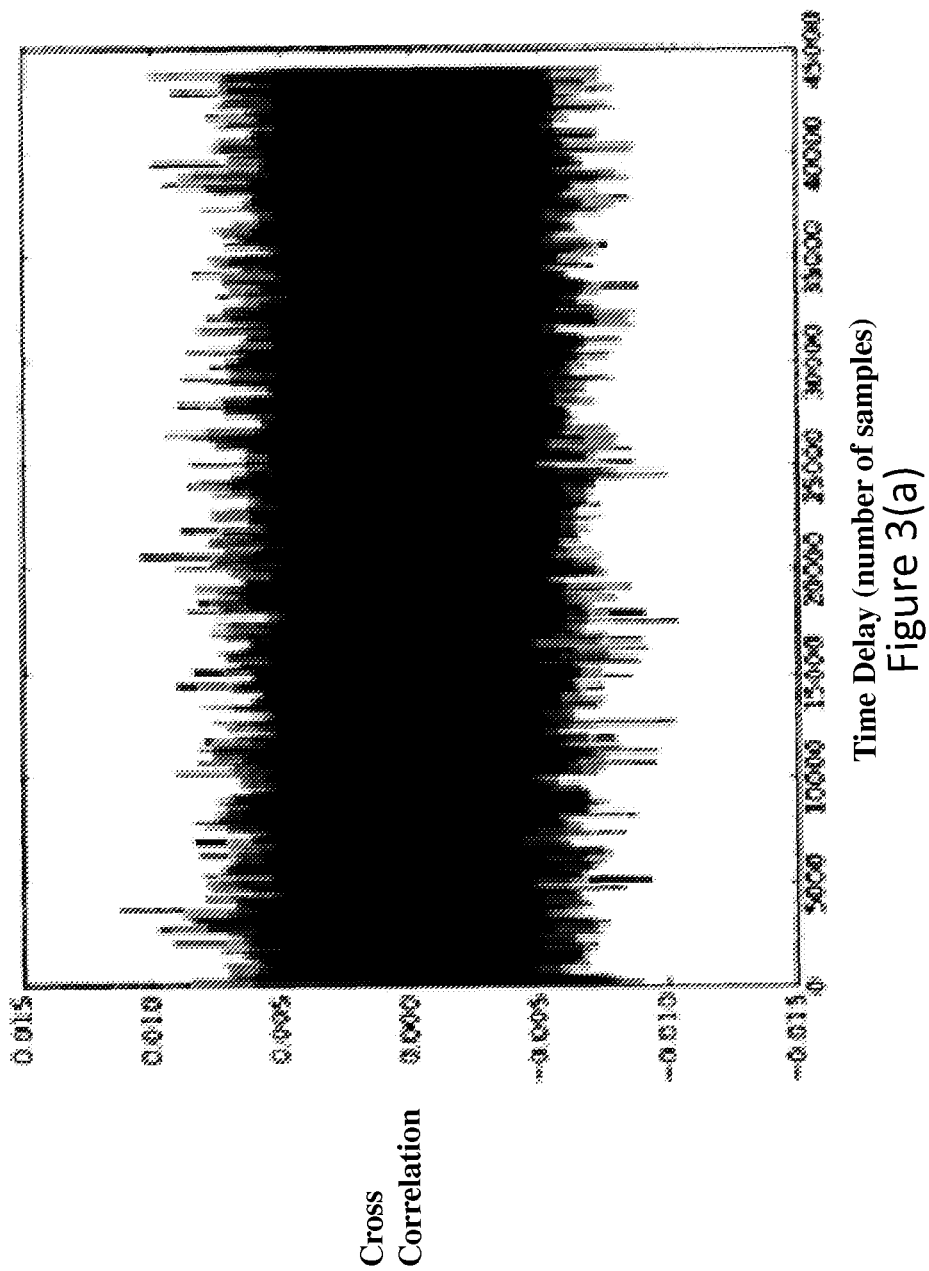

LOCALIZATION USING MODULATED AMBIENT SOUNDS

BACKGROUND

Applications from the field of indoor localization include indoor navigation, location tagging and tracking. Related art in this area has focused on passive localization, in which the localized entity does not make an active effort to get localized. For example, a camera-based person localization may not have been initiated by the person in question. Certain related art systems may not preserve user privacy, while other related art systems may preserve privacy (e.g. wireless based systems) but may not provide sufficient precision for indoor localization.

Related art systems attempt to address the problem of indoor localization by using different technologies. Related art wireless-based systems report a median localization error of more than a meter, and may involve extensive setup and tuning. The localization error for related art systems based on Global Systems for Mobile communications (GSM) and Radio Frequency Identification (RFID) also fall within a range of more than a meter. To attain sub-meter accuracy, related art optical and acoustic based systems have been developed.

Related art localization systems can conceptually be classified into source localization systems and receiver localization systems. Related art source localization systems employ multiple receivers with known positions to sense signals from a source. By analyzing these signals, the system can localize the source. Related art camera-based (optical) systems and most acoustic systems using microphones in the related art fall in this category. However, since such related art systems deploy multiple receivers, the related art systems can potentially record the user's actions or voice without an explicit approval from the user, thus raising privacy concerns.

Related art receiver localization systems can be further sub-categorized as those using unmodulated signals and those that use modulated signals. The receiver records the sensed signal and either analyzes it in-situ or sends the recorded signal to a server to process it and determine user location. Systems using unmodulated signals either use multiple receivers or use collaborative sensing while simultaneously trying to localize multiple receivers. The unmodulated systems are similar to source localization systems in that regard. Source localization systems compare signals received at receivers whose locations are known, with the signal received at the receiver whose position needs to be determined. Related art systems that use collaborative sensing of unmodulated signals require a number of receivers that are simultaneously trying to localize themselves. Other collaborative related art systems take a hybrid approach by using both a source and receiver in the device trying to localize itself. However, such collaborative systems cannot be used to localize a single receiver unless recorded signals from other receivers are available.

Related art systems using modulated signals utilize ultrasonic waves due to their better ranging accuracy as compared to those that use an audible sound. However, these systems have several limitations as they often require heavy and often expensive infrastructure by utilizing ultrasound transducers that only exist in the environment for that purpose. Further, ultrasound has a limited range as it suffers from greater attenuation while propagating through air, in comparison to an audible sound.

Additionally, ultrasonic receptors are not commonly found in mobile devices. Hence, a mobile device cannot be used for localization without requiring additional ultrasonic hardware.

SUMMARY OF THE INVENTION

Aspects of the exemplary embodiments include a mobile device, that includes a sensor (e.g. a microphone, etc.) that receives a broadcast (e.g. audio, etc.); an arrival time calculating unit comparing the received audio signal to a plurality of audio tracks and estimating an arrival time of each of the plurality of audio tracks; and a location determination unit determining a location of the mobile device based on the estimated arrival time of each of the plurality of audio tracks and a location associated with each of the plurality of audio tracks.

Additional aspects of the exemplary embodiments include a computer program product with a non-transitory computer readable medium having computer readable program code embodied therewith. The computer readable program code contains code for receiving a broadcast (e.g. audio, etc.); comparing the received broadcast to a plurality of audio tracks; estimating an arrival time of each of the plurality of audio tracks; and determining a location of the mobile device based on the estimated arrival time of each of the plurality of audio tracks and a location associated with each of the plurality of audio tracks.

Additional aspects of the exemplary embodiments include a method, that includes receiving a broadcast (e.g. audio); comparing the received broadcast to a plurality of audio tracks; estimating an arrival time of each of the plurality of audio tracks; and determining a location of the mobile device based on the estimated arrival time of each of the plurality of audio tracks and a location associated with each of the plurality of audio tracks.

BRIEF DESCRIPTION OF THE DRAWINGS

These, and or/other aspects will become more readily appreciated from the following description of the embodiments, taken in conjunction with the accompanying drawings, in which:

FIGS. 3(a) and 3(b) illustrate a correlation of the recorded signal versus the output signal, in accordance with an exemplary embodiment.

DETAILED DESCRIPTION OF THE INVENTION

Figure 1:
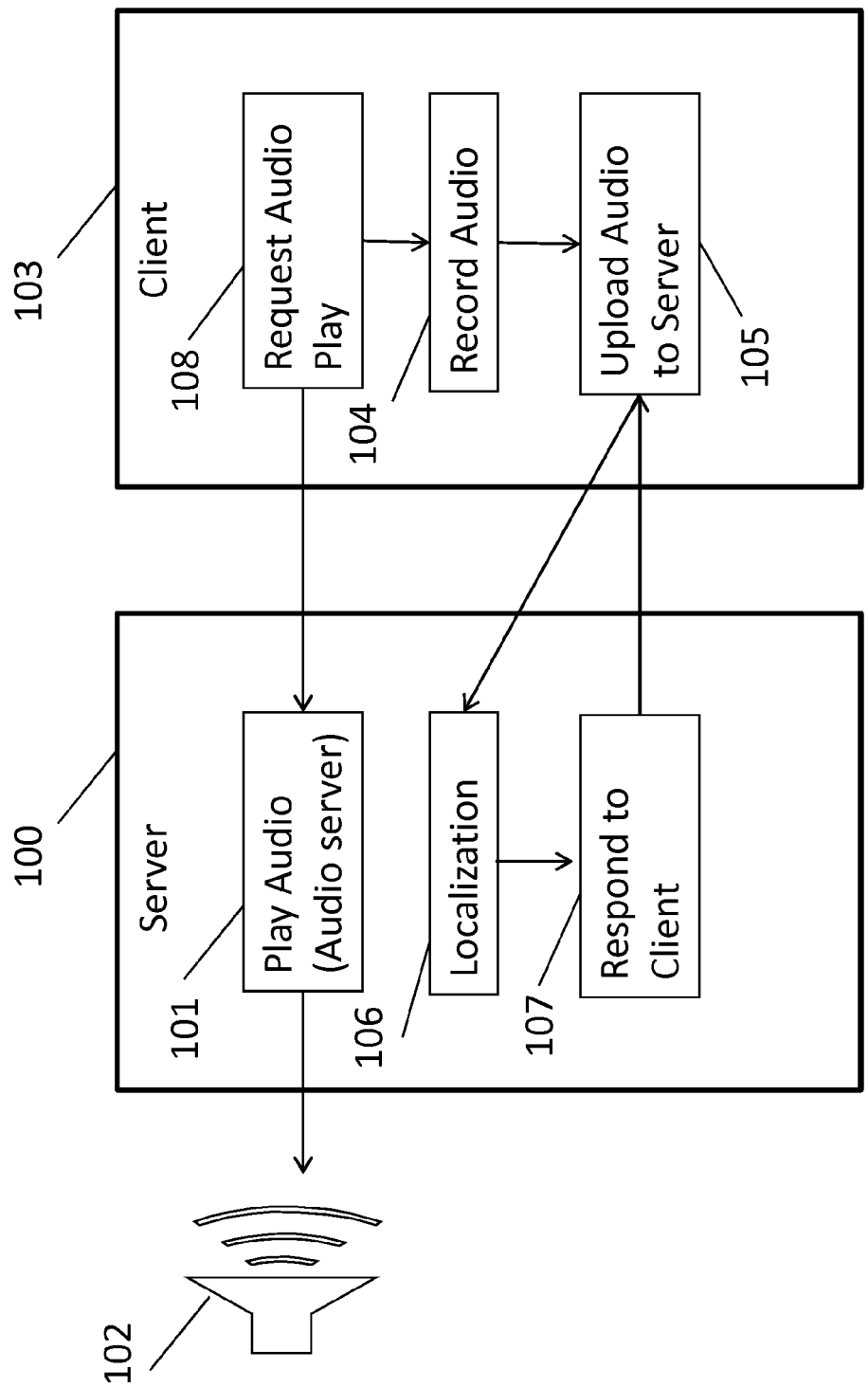
FIG. 1 illustrates an implementation of an exemplary embodiment in a server-based architecture.

Audible sound based systems can provide sub-meter accuracy, which is sufficient for applications such as indoor navigation. Therefore, the exemplary embodiments utilize audible sound to localize a microphone, which is present in related art mobile devices. The exemplary embodiments provide an indoor localization system that has sub-meter accuracy without requiring dedicated expensive infrastructure like the ultrasound based systems in the related art. Unlike ultrasound systems, which can use sufficient power to provide a good signal to noise ratio for accurate localization without disturbing people, audible sound systems utilize low power signals which are barely audible, or use signals designed to be pleasant or meaningful to people. Exemplary embodiments of the application are directed to the use of low-energy, barely audible signals. The exemplary embodiments consider the following aspects:

Accuracy: Accuracy on the order of a meter or less is necessary for indoor navigation applications to work correctly.

Minimum infrastructure requirement: The setup should not require any dedicated expensive equipment to be installed in the environment, and should work with off-the-shelf consumer devices, such as mobile devices, laptops, tablets, etc.

Ease of use: Users should not be required to have any specialized or dedicated gadget or procedure. An application running over a mobile phone or laptop should be sufficient.

Privacy preserving & noninvasive: Localization procedure should be initiated by the user. The exemplary embodiments should not require potentially invasive devices (e.g., microphones) to be placed into the environment.

Large indoor locations such as malls, consumer stores, museums, etc. may include many loudspeakers for addressing the public, or for playing music for customer entertainment. Large indoor workspaces may include 'sound conditioning' speakers to play noise or ambient sounds to soften the other environmental noise. With modification, these setups can be leveraged to provide additional functionality to allow users to determine their location. The exemplary embodiments are thereby directed to a system that plays multiple audio sounds through different speakers, which can be recorded by a user's mobile device. Recorded audio can then be used to determine user's location.

The basic method for localization in the exemplary embodiments is to analyze the timing required for signals to be received by the microphone from the various loudspeakers. Suppose particular known signals are played from each speaker starting at time $t_0$. Suppose that the time the signal from each speaker i reaches the microphone is estimated to be $t_i$ which can be done using methods such as cross correlation. If the speaker positions and $t_0$ are known, the distances from the microphone to each speaker can be determined, and the microphone position can be found by trilateration or triangulating the position of the microphone. Even if $t_0$ is unknown, if $t_i$ is known for several speakers, $t_0$ and the microphone position can all be determined. The exact number of speakers and $t_i$ estimates needed depend on assumptions made and the solution method adopted.

The exemplary embodiments supports two different modes: 1) a server-based processing mode and 2) a client-based processing mode. FIG. 1 illustrates an implementation of an exemplary embodiment in a server-based architecture. In FIG. 1, processing is done by the server 100. A controller 101 modulates the broadcast from each of the speakers 102 in the environment. The broadcasts are recorded 104 by the device 103 that wants to localize itself. This recorded audio file is sent to the server 105 via an Internet connection or by wireless. The server processes the audio file to determine location of the microphone 106 and sends a response 107 to the microphone of the client 103. According to this approach, the client application could also be used to allow users to affect the sounds played in the environment 108. Further, the processing algorithms can be implemented and updated on the server.

Figure 2:
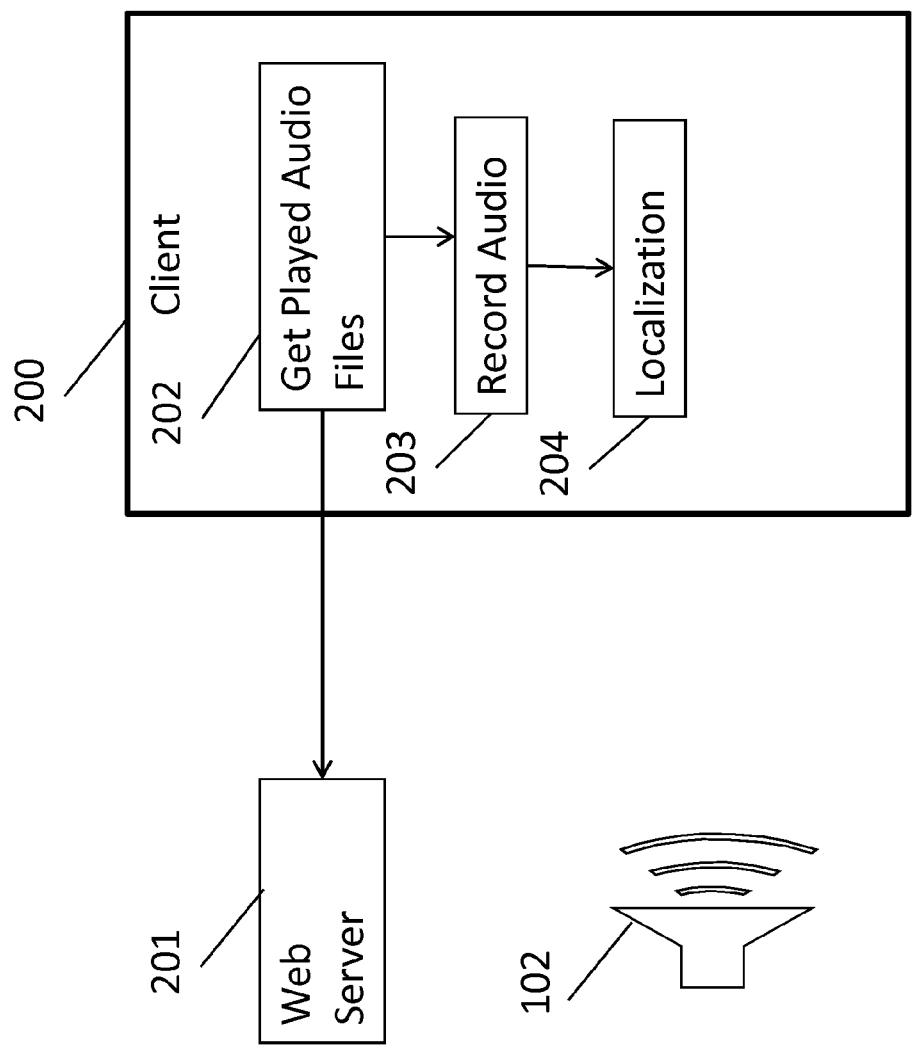
FIG. 2 illustrates an implementation of an exemplary embodiment in a client-based architecture.

FIG. 2 illustrates an implementation of an exemplary embodiment in a client-based architecture. In a client-based architecture, a client 200 records and processes ambient sound 203 to determine its location 204. The client 200 may achieve this by using a microphone. The client needs to know the modulated sounds played 202 from each of the speakers 102, along with position of each speaker. This information can be made available to the client through a webserver 201. In this approach, a simple webserver can be used for this purpose, without needing to deploy an audio server. For example, the audio could be generated by 5.1 or 7.1 surround audio Digital Versatile Discs (DVDs) or similar consumer equipment. This approach is also scalable since the processing required by a client is performed on that client. It also does not require scheduling coordination among clients.

In exemplary embodiments, the signals are played by loudspeakers at known locations using a multichannel audio system providing synchronization across tracks. The notation used throughout the application is summarized below:

N Number of speakers
$f_s$ Sampling rate
$s_i(t)$ Signal played through speaker i, (i=1 ... N)
r(t) Audio signal recorded by the microphone
$\hat{t}_0$ The time each signal $s_i(t)$ starts playing in the player's time frame
$t_0$ The time signal $s_i(t)$ starts playing at speaker i
$t_i$ Time of arrival of signal $s_i(t)$ at microphone's time frame
$(X_i, Y_i, Z_i)$ Position of speaker i
(x,y,z) Position of microphone (to be determined)
c Speed of sound
$R_{g,h}(\tau)$ Cross-correlation of signal g(t) with signal h(t) for lag $\tau$
$R_{ij}(\tau)$ Shorthand for $R_{s_i,s_j}(\tau)$ The system playing the signals has a sampling clock that may not perfectly synchronize with the sampling clock of the recording system. Denote the time that signals are first played by the system, in the system clock's frame as $\hat{t}_0$. Unless otherwise indicated, all other times are assumed to be in the recording system's clock frame.

Assume that the sound from all of the speakers is played at time $t_0$ and sound from speaker i reaches the microphone at time $t_1$. The propagation delays $t_1 - t_0$ are related to the speaker and microphone placement by $$d_i = c(t_1 - t_0) = \sqrt{(x-X_i)^2 + (y-Y_i)^2 + (z-Z_i)^2} \quad (1)$$

There is a distinct such equation for each speaker i. The arrival times $t_1$ of the signals can be estimated as described in the next section. The remaining unknown quantities are the microphone position (x, y, z) and the time $t_0$ at which all signals start playing.

Audio signals at the microphone can be modeled in terms of linear systems theory as $$r(t) = \sum_i h_i(t) * s_i(t) + \eta(t) \quad (2)$$

where $h_i(t)$ is the impulse response between the speaker i and the microphone, and $\eta(t)$ is additive noise. A simplified version of this is to assume the impulse function is a weighted delta function shifted by the amount of the propagation delay.

$$r(t) = \sum_i \omega_i s_i(t - \tau_i) + \eta(t) \quad (3)$$

Here $w_i$ is the amount of attenuation that signal $s_i(t)$ undergoes before reaching the microphone, and $$\tau_i = t_i - t_0 = \frac{d_i}{c}$$

is the propagation delay of the sound from speaker i to reach the microphone.

The signal arrival times can be estimated by using cross correlation or other related methods. The cross correlation between signals $s_i$ and $s_j$ is defined as $$R_{ij} \equiv R_{s_i,s_j}(\tau) \equiv \sum_t s_i(t)s_j(t+\tau) \quad (4)$$

By linearity, the cross correlation of the signal $s_i$ played at speaker i with the recorded signal is $$R_{s_i,r}(\tau) = \sum_j \omega_j R_{s_i,s_j}(\tau - \tau_j) + R_{s_i\eta}(\tau) \quad (5)$$

If $s_i(t)$ are selected so that $$R_{s_i,s_i}(0) \gg R_{s_i,s_i}(\tau)(\tau \neq 0) \quad (6)$$

$$R_{s_i,s_i}(0) \gg R_{s_i,s_j}(\tau)(\tau \neq j) \quad (7)$$

$$R_{s_i,s_i}(0) \gg R_{s_i,\eta}(\tau) \quad (8)$$

then $R_{s_i,r}(\tau)$ will have its largest peak at $t_i$ where $t_i$=argmax $R_{s_i,r}(\tau)$.

In general, due to the presence of noise and multi-paths between the source and the receiver, utilizing cross-correlation may not give distinctly identifiable peaks. Various generalized cross-correlation techniques have been developed to rectify this issue. The correlation can be computed in the spectral domain by $$R_{s_i,s_j}(\tau) = \mathcal{F}^{-1}\{S_i^*(\omega)S_j(\omega)\} \quad (9)$$

where $s_i^*(\omega)$ is the conjugate of the Fourier transform of $s_i(t)$, $S_j(\omega)$ is the Fourier transform of $S_j(t)$, and $\mathcal{F}^{-1}$ denotes the inverse Fourier transform. Performing the cross correlation in this way has computational advantages, essentially reducing computation time for a full correlation for signals of length n from $O(n^2)$ to $O(n \log n)$, but also allows normalization or filtering to be carried out in the spectral domain, by multiplying by a weight $W(\omega)$. Different schemes for the weight $W(\omega)$ yield a class of generalized cross correlations which has been well studied. In particular we have found good results using the so called Phase Transform (PHAT), which uses $$W(\omega) = \frac{1}{|S_i^*(\omega)S_j(\omega)|}$$

giving $$PHAT_{s_i,s_j}(\tau) = \mathcal{F}^{-1}\left\{\frac{S_i^*(\omega)S_j(\omega)}{|S_i^*(\omega)S_j(\omega)|}\right\} \quad (10)$$

PHAT tends to work better than Cross Correlation, and although examples described herein are given in terms of $R_{s_i,s_j}(\tau)$, it should be understood that $PHAT^{s^i,s^j(\tau)}$ may be preferable instead.

Note that in practice when $s_i$ is cross correlated with r, the signal that was actually played, $\hat{s}_i(t)$ is defined so that $\hat{s}_i(0)$ is the first sample. Then $\hat{s}_i(t)=s_i(t+t_0)$, and the time for the signal to reach the microphone is estimated as:

$$t_i = \underset{\tau}{\mathrm{argmax}}\, R_{\hat{s}_i,r}(\tau) \quad (11)$$

These estimates are then used to solve for the locations.

Once $t_i$ is determined for each speaker, equations (1) for each i have four unknowns—x, y, z and $t_0$. Therefore four independent equations are required to determine these unknown parameters. Since each speaker provides one equation, at least four speakers are needed to determine all parameters.

Any non-linear optimization methods can be used to estimate the parameters by minimizing the following error function.

$$f(x, y, z, t_0) = \sum_i \left(\sqrt{(x-X_i)^2 + (y-Y_i)^2 + (z-Z_i)^2} - c(t_i - t_0)\right)^2 \quad (12)$$

Note that if $t_0$ is known, only three equations, and estimates of the $t_i$ for three speakers are needed. Further, if $t_0$ and Z are known (e.g. by making an assumption about the height at which a mobile device is being held) only two $t_i$ are needed, to solve for position.

Non-linear formulation suffers from typical issues related to non-linear solvers. For example, the non-linear formulation is prone to finding local optimum. The results also depend on the initialization. To overcome these limitations, a linear formulation can be used. By taking the difference of equation (1) after squaring both sides between speaker i and j, the following linear equation is obtained:

$$(X_i - X_j)x + (Y_i - Y_j)y + (Z_i - Z_j)z - c^2(t_i - t_j)t_0 = \quad (13)$$
$$\frac{1}{2}[(X_i^2 - X_j^2) + (Y_i^2 - Y_j^2) + (Z_i^2 - Z_j^2) - c^2(t_i^2 - t_j^2)]$$

However, this formulation would require four linear equations to solve for all four unknowns, which would require five speakers. If all of the speakers are arranged in the same plane, the following linear equation can be derived:

$$(X_i - X_j)x + (Y_i - Y_j)y - c^2(t_i - t_j)t_0 = \quad (14)$$
$$\frac{1}{2}[(X_i^2 - X_j^2) + (Y_i^2 - Y_j^2) - c^2(t_i^2 - t_j^2)]$$

Only three linear equations (four speakers) are now needed to find the values of parameters x, y and $t_0$ Once these are known, equation (1) can be used to find z. Using the fact that z can be either above the speaker's plane, or below it (depending on whether speakers are arranged on the floor or ceiling respectively), one can eliminate one of the two values of z given by equation (1).

Sounds played through different speakers may be uncorrelated to one another. White noise and its derivatives (brown noise, pink noise) are good candidates for this purpose. However, playing noise could be annoying to most people. Depending on different situations, different set of audio signals can be played. The following is a non-exhaustive summary of different scenarios:

Barely audible noise: This is ideal for situations like offices. There is often a low humming noise generated in most offices, for example, due to personal computers, air conditioners and other equipment. Adding a barely audible noise to this hum would not adversely affect the environment. In some cases, people often prefer hearing a low volume white noise rather than other sounds around, such as conversations between two other colleagues. Office "white noise" generators may be used for this purpose.

Distinctly audible sound: In some situations, sounds which are pleasant or soothing can be played in the backdrop. "Brown noise" can be used for this purpose.

Multi-track or modulated music: In many shopping malls, a music is being played throughout the store. Different tracks of the music (e.g. containing different voices or sets of instruments) may be played from different speakers. Alternatively, uncorrelated low power white noise signals can be added to the different tracks so that the noise is barely perceptible over music and still be used for localization purpose. Due to linear nature of signal superposition, cross-correlation between recorded audio and added white noise can still be used to determine the propagation delay.

In addition to choosing the type of sound, the length of signal should be considered. If a short signal is used for localization, it allows quicker (lower latency) determination of position. However, it may be less robust. During the time it was played bursts of noise in the environment may hinder estimates of the $t_i$. Also for longer signals, it may be easier for the signals to be different, because there are more periods of time during which the signals are different. Consider different tracks of multi-track recorded music. Over the course of a whole song, each track will typically have periods where it is distinct from other tracks, for example because an instrument associated with that track was playing. During short periods, tracks may be much more similar.

These considerations can be made more precise in terms of equations (6)-(8). For a given signal $s_i(t)$ is a 'true peak' that will be found when it is correlated with r(t) would be of size $\omega_i R_{s_i,s_i}(0)$. Other "false peaks" would arise from high values of $\omega_j R_{s_j,s_j}(\tau)$, $\tau \neq 0$ or $\omega_i R_{s_i,s_j}(\tau)$. The values of $\omega_i$ depend on placement of speakers and microphones, and will vary from one case to another, but heuristically, a fitness S can be defined by $$S = \frac{R_{s_i,s_i}(0)}{\max(\mathrm{argmax}_{\tau \neq 0} R_{s_i,s_i}(\tau), \mathrm{argmax}_{j \neq i} R_{s_i,s_j}(\tau))} \quad (15)$$

Note that for zero mean uncorrelated pseudo random noise signals of length n, $R_{ii}(0)$ grows with n, but $R_{ij}(\tau)$ for $\tau \neq 0$ and $R_{ii}(\tau)$ have expectation zero, and grow like $\sqrt{n}$. This suggests that for pseudo random white noise, by taking very long sequences, we can get good localization, even for weak signals.

Figure 3B:
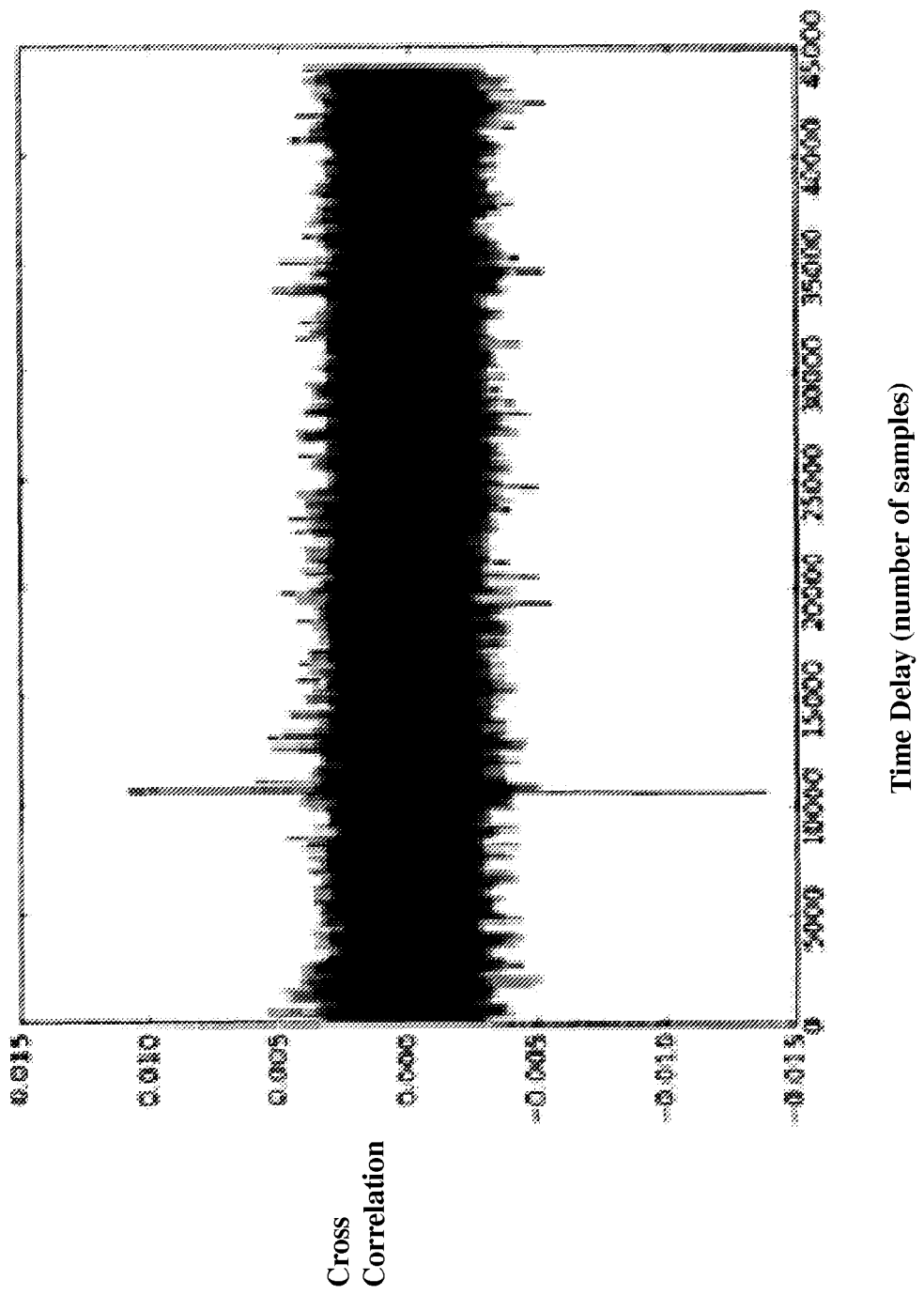

FIGS. 3(a) and 3(b) illustrate a correlation of the recorded signal versus the played signal, in accordance with an exemplary embodiment. In FIGS. 3(a) and 3(b), the y-axis measures cross correlation, and the x-axis measures time delay. The units used for showing the time delay (x-axis) are the number of samples. The figures provided illustrate the position along the x-axis with the maximum y-value as a 'peak', which gives an estimate of the time delay between when the time the signal was sent and when it was received. FIG. 3(a) illustrates the correlation of a recorded signal with the one second long played signal. FIG. 3(a) is generated by extracting only the first second of both the recording and the played signal. FIG. 3(b) illustrates the correlation between a ten second long recording with a ten second long played signal. From comparing FIG. 3(a) to FIG. 3(b), a ten second signal is seen to give a much more pronounced peak than a one second signal recorded under the same circumstances.

There is some difficulty when using long noise sequences to obtain a good signal to noise ratio. Consider a 30 second sequence of random numbers used for white noise. At the sampling rate $f_s$ of 44100 samples/sec., this results in 1,323,000 samples. Suppose that the sampling rates of the playing and recording devices are both close to 44,100, but differ slightly. For example, suppose the phone used to record this signal is really recording at a rate of 44,996 samples/sec. Then if a τ is chosen so that the samples at the beginning of the 30 second signals 'line up', the samples at the end will be offset by a few samples, and will be uncorrelated. Assuming the clock rate difference is known, this can be compensated for by converting the samples to the same rate. Alternatively, the cross correlation can be computed in a windowed fashion, so that a relatively small window of a played signal $s_i(t)$ and a small window of the recorded signal r(t) and used to compute correlations for those windows. The windows can then be advanced, and the correlations accumulated. It can be shown that this method gives the same final result for computed correlations. However if the clock 'drift' rate α, that is the ratio of sampling rates for the playing device and recording device, is known, it can be taken into account when the correlation using different windows is computed. This allows for very sharp peaks for longer sequences.

Denote the played signal, herein referred to as the "signal" as s(t). The recorded signal, r(t) is herein referred to as the "recording". Divide s(t) into multiple segments, each of length G. The segments are referred to as $s_0, s_1, \ldots, s_{M-1}$, where M is the number of segments in s(t). The Fast Fourier Transform (FFT) Length, denoted by F, is determined as twice the next higher power of 2 than G. While taking the FFT of the signal's segments, p=F−G zeros are padded to each segment to make their length equal to F. The recording r(t) is also divided into multiple overlapping segments shifted by p, each of length F (except for the last one which may be smaller than F). These segments are labeled as $r_0, r_1, \ldots, r_{K-1}$, where K is the number of segments in the recording. Let $R_{s_m,r_k}(\tau)$ represent the correlation of the m-th signal segment with the k-th recording segment, and $R_{s_m,r}$ represent the correlation of $s_m$ with the whole recording. $R_{s_m,r_k}$ is computed only for the values of τ in the range of 0 to p−1, and is taken as 0 for other τ. Then $$R_{s_m,r}(\tau) = \sum_{k}^{K-1} \gamma(m, k, \tau) R_{s_m,r_k}(\tau - kp) \quad (16)$$

-continued $$R_{s,r}(\tau) = \sum_{m}^{M-1} R_{s_m,r}(\tau + mG) \quad (17)$$

$\gamma(m, k, \tau)$ is 1 if the m-th signal segment overlaps with the recording segment $r_k$ for lag r, otherwise, it is 0. Assuming that the cross-correlation for lag between $r_1$ and $r_2$, it is possible to avoid computing correlations between segments that do not overlap for any desired lag between $[r_1, r_2]$.

To account for clock drift, if $f_s$ and $f_m$ are the sampling rates of the speaker system and the microphone system, respectively, then the drift rate is defined as $\alpha = f_m/f_s$. To correct for clock drift, equation (17) is modified to be $$R_{s,r}(\tau) = \sum_{m} R_{s_m,r}(\tau + m\alpha G) \quad (18)$$

Exemplary embodiments can also utilize a continuously tracking server to track a user device over an extended period of time. The tracking server can make initial assumptions for some of the variables to be solved (e.g., assume z is at 1.25 meters or roughly typical height of a mobile device being held by a user). The tracking server can also assume that $t_0$ does not change for a recording device if it can keep track of the samples recorded since the beginning of the localization. Periodic signals with period T can be played from all speakers. The recorded signal may demonstrate correlation peaks at lag values in the interval of (−T, T).

In order for the tracking server to process received data in real-time, the tracking server obtains a good bound on correlation lag values (e.g. $\tau_{min}$ and $\tau_{max}$) within which the peaks would occur. To obtain these values, the tracking server initially searches for peaks over the entire time period T in the correlation signal for each speaker. Once the tracking server finds the location of a strong peak in any of the correlations, the tracking server can choose a window around the strong peak as the defining $[\tau_{min}$ and $\tau_{max}]$ range. The size of this window may depend on the room or venue size. For example, with a block size of 4096 samples at 44.1 kHz, the tracking server may find an appropriate lag window in less than half a second. Further, the tracking server can conduct this on a one-time-per-session process, after which the user device can be tracked in real time.

Once an appropriate window has been determined, an algorithm can be used to continuously determine the location. An exemplary algorithm is shown in the table below:

TABLE 1

| Exemplary Algorithm |
|---|
| Input: Speaker positions $P_i$; played speaker signals $s_i$; approximate height of microphone z; peak window size W ; peak threshold $p_{th}$; residue threshold $r_{th}$ |
| 1  Initialize: $t_0$* = null |
| 2  while true do |
| 3  \|  r(t) ← new recorded signal |
| 4  \|  $R_{s_i,r}(\tau)$ ← cross-correlation of r(t) with $s_i$(t) |
| 5  \|  $\{t_i\}$ ← detectPeaks($R_{s_i,r}(\tau)$,W,$p_{th}$) |
| 6  \|  {x,y,$t_0$}, residue ← nonlin_xyt0($P_i$, $\{t_i\}$, z, 4) |
| 7  \|  if residue < $r_{th}$ then |
| 8  \|  \|  Output x,y,z |
| 9  \|  \|  $t_0$* ← $t_0$ |
| 10 \|  else |

TABLE 1-continued

| Exemplary Algorithm |
|---|
| 11 \|  \|  if $t_0$* not null then |
| 12 \|  \|  \|  {x,y}, residue ← nonlin_xy($P_i$, $\{p_i\}$, z, 3, $t_0$*) |
| 13 \|  \|  \|  if residue < $r_{th}$ then |
| 14 \|  \|  \|  \|  Output x,y,z |
| 15 \|  \|  \|  end |
| 16 \|  \|  end |
| 17 \|  end |
| 18 end |

In the exemplary algorithm, the subroutine nonlin_xyt$_0$ in line 6 receives as input the speaker positions ($P_i$, i=1, ..., N), the determined peaks ($\{t_i\}$), an approximate value of z and a number of speakers to use (e.g. 4 in this example), to estimate x, y and $t_0$. It also returns a residue which is the value of the error function defined in equation 12. The residue provides an indicator as to the effectiveness of the solution. If the residue is small, the determined location will tend to be very close to the actual location. If the residue is large, the solution provided may be incorrect. If a good solution is found, the value of $t_0$ is kept as $t_0$*. If nonlin_xyt$_0$ fails to find a good solution, the value of $t_0$* is used in subsequent iterations of nonlin_xyt$_0$ (line 12) to estimate x and y (with three speakers in this example).

Figure 4A:
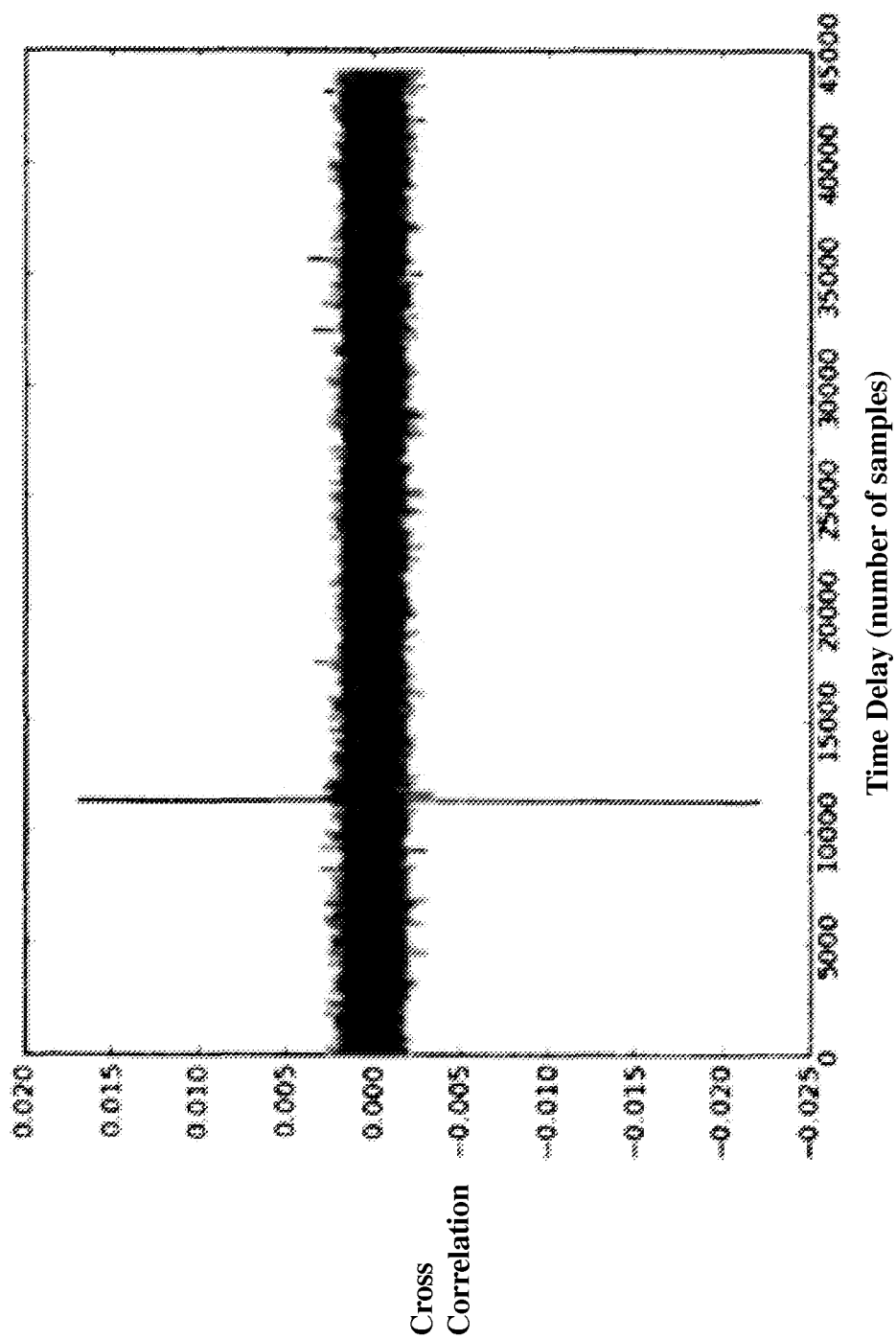
FIGS. 4(a) and 4(b) illustrate the correlation of the recorded signal versus the output signal with and without drift correction in accordance to an exemplary embodiment.
Figure 4B:
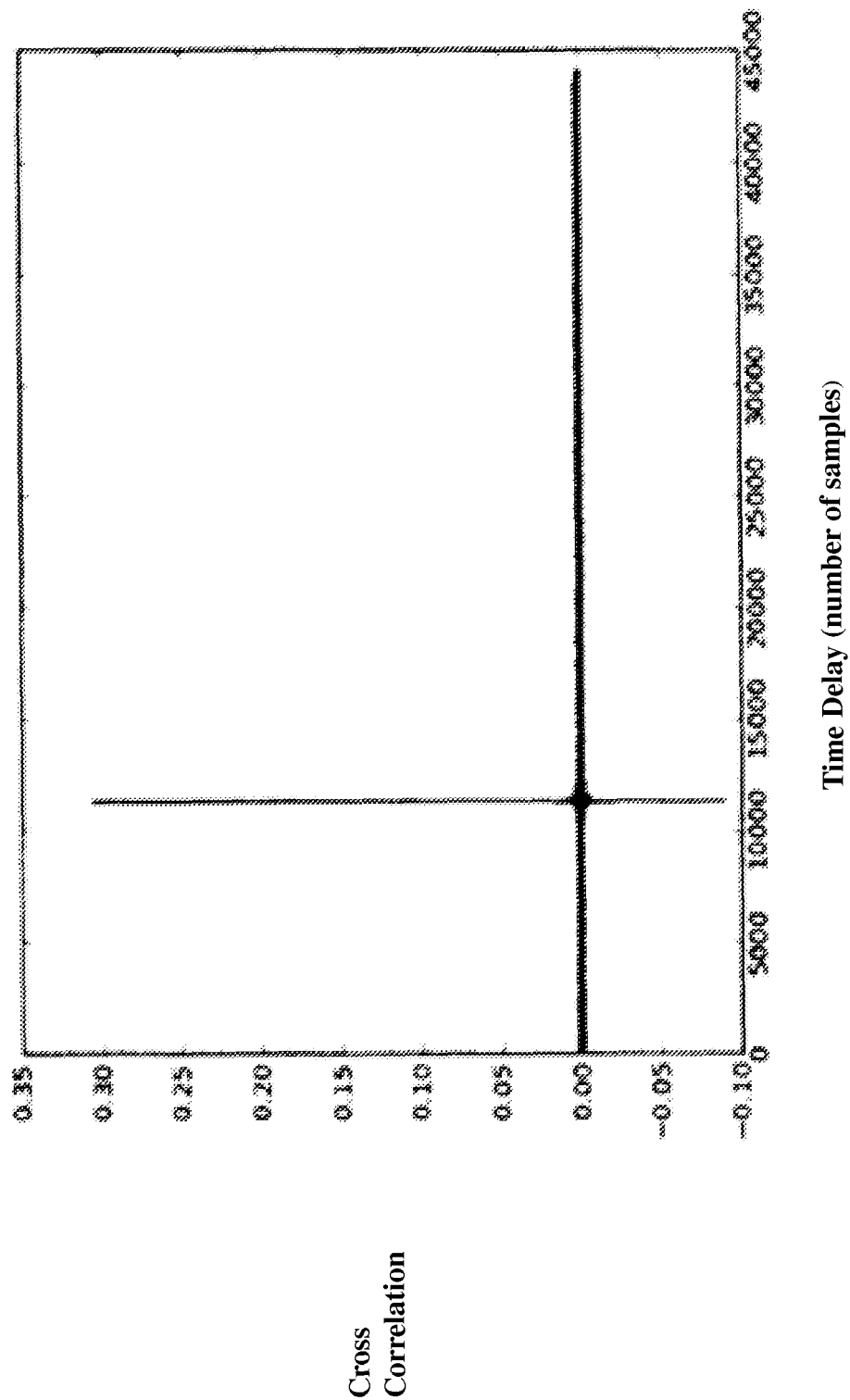

FIGS. 4(a) and 4(b) illustrate the correlation of the recorded signal versus the played signal with and without drift correction in accordance to an exemplary embodiment. The y-axis measures cross correlation, and the x-axis measures time delay. The units used for showing the time delay (x-axis) are the number of samples. FIG. 4(a) illustrates the correlation of a 30 second long duration recording with the played signal without correcting the clock drift between the clocks of playing and recording devices. FIG. 4(b) illustrates the correlation with drift correction. In both cases, the correlation peaks are the same for a 30 second recorded segment, with and without drift correction. However, the ratio of peak height to background noise level is several orders of magnitude better when using drift correction.

As seen above, $t_0$ can be determined given enough equations. But each equation requires an estimate $t_i$ for another speaker. It may only be possible to get good estimates of $t_i$ for a few of the closest speakers. Thus it is preferable to know $t_0$ by some other means.

Because $t_0$ is the instant at which samples from the signals are first played, the system playing the samples should know when this occurs. If this system is a computer it can use a time protocol such as Network Time Protocol (NTP) to try and keep synchronized with clocks used by the recording system. This is attractive, but suffers from two problems in practice. One problem is the slight error between system clocks on the playing and recording systems. Another problem is that on each of those systems, there is latency between the time when software initiates the playing or recording of samples by the audio device, and the times returned by system calls to the system clock. Because of these issues, it is difficult to an adequate estimate of $t_0$ for the desired accuracy of microphone location estimation.

One way around this problem would be to send an additional signal to be used for synchronization by another channel which is nearly instantaneous relative to acoustic speeds. This could be done by modulating the ambient light in the environment, or by sending a radio frequency signals, such as on a Frequency Modulated (FM) channel. These methods would help make the system more robust by reducing the number of good estimates of $t_i$ by one. Unfortunately, they complicate the infrastructure and would require the recording equipment to have additional capabilities to receive light or Radio Frequency (RF) signals. However, once the system has made a good estimate of x, y, z and $t_0$, this estimate of $t_0$ can be used to synchronize between the playing and recording clocks. This can be used so that for subsequent location estimates, $t_0$ does not need to be re-estimated. The key to this method, is that when the recording client starts, it should get the system clock time, and immediately start reading audio sample buffers from its audio device. It should continually read buffers, and maintain a count of the index of the first sample of each buffer relative to the first sample read when the recording process started. Then, anytime the client actually wants to record a segment to use for localization, it will have the sample index of the first sample. This should also be done on the playing system. If this is done, once $t_0$ is determined, the playing and sampling clocks are related by $\tilde{t}=\alpha t-t_0$, where $\alpha$ is the ratio of clock speed times, normally very close to one.

Short segments of periodic pseudorandom white noise may be used for, or added to an audio track so that the mobile device does not need to store, or compute the correlations with a full long duration audio track, and can compare with the periodic short segment instead. For example, half a second or a second of periodic pseudorandom white noise integrated with an audio track can be utilized. In an exemplary implementation, the mobile device could have the periodic pseudorandom white noise stored in the device.

In another exemplary implementation, pseudorandom seed numbers or sequences representing the pseudorandom white noise can also be utilized. In this exemplary implementation, the pseudorandom seed sequence or number is obtained from the server, and the corresponding pseudorandom white noise can be determined from the obtained seed.

An experimental setup environment was created to test exemplary embodiments. Six wall mounted speakers near the ceiling were used as audio sources, and a mobile device was used as the receiver. The mobile device recorded audio and uploaded it to a pre-configured server over a wireless connection. 20 points scattered throughout the room were chosen.

Two different modes of playing audio were used for experiments. In one, a two second sound consisting of brown noise shaped in a way to sound like a crashing wave was played at a distinctly audible volume. In the other mode, white noises playing through each speaker were recorded for ten seconds by the mobile device before uploading the data to the server. In this mode, the audio level was barely audible.

For each mode, three recordings were done at each test location in the room. Location estimation performance is compared for the case when all speakers were used to estimate the location, and the case when only the best four speakers (based on Signal to Noise ratio) were used.

Figure 5A:
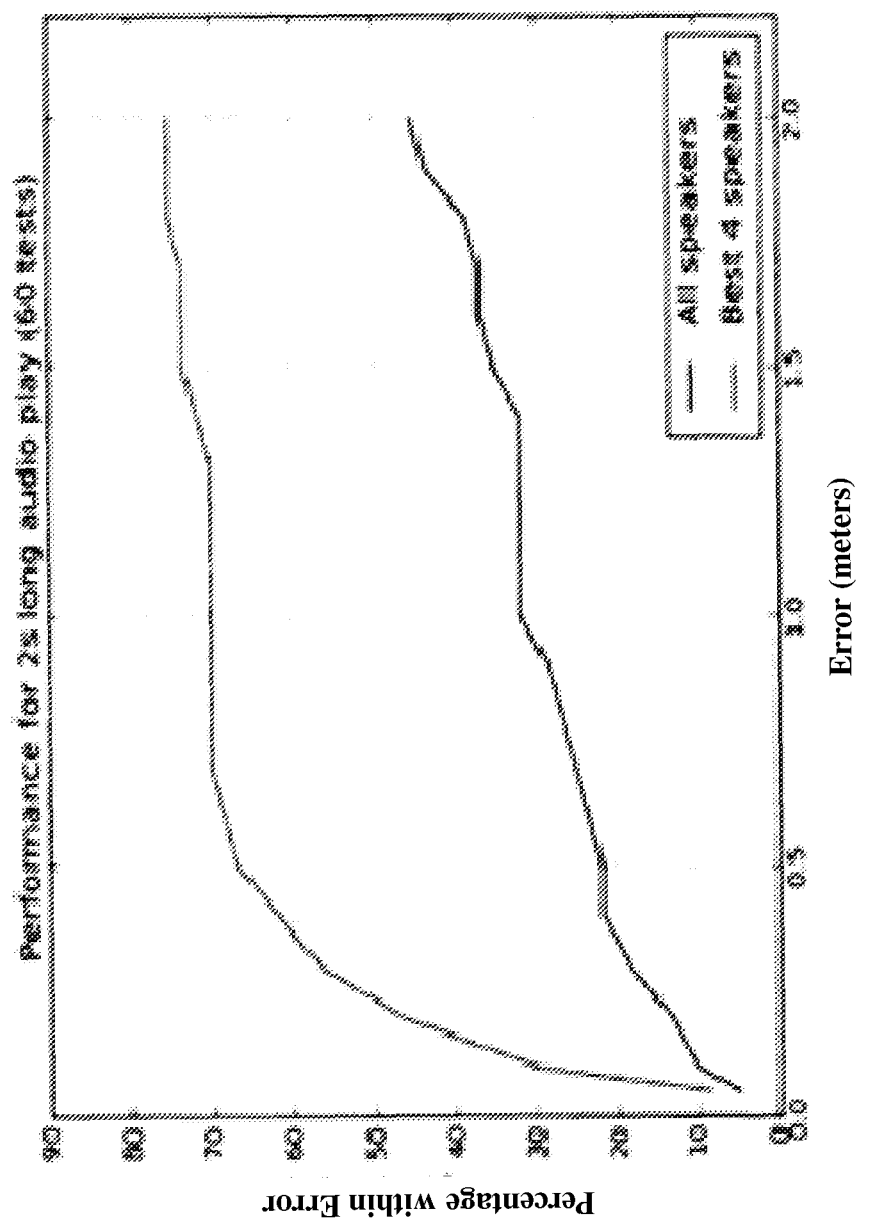
FIGS. 5(a) and 5(b) illustrate experimental results for location estimate accuracy, in accordance with exemplary embodiments.
Figure 5B:
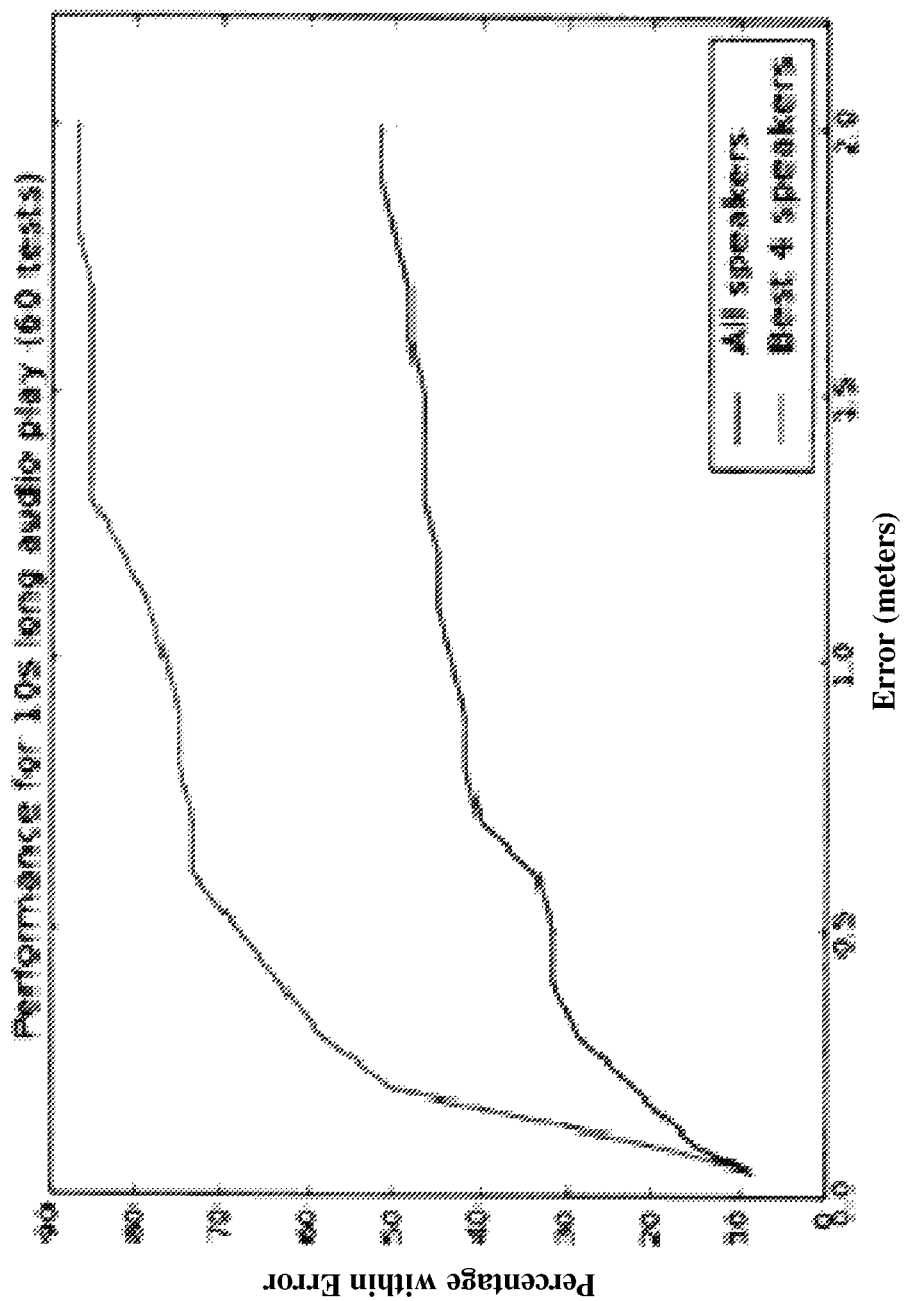

FIGS. 5(a) and 5(b) shows the performance for the two modes of recording. Longer recording does improve the performance. In both cases, the accuracy is within 50 cm almost 70% of the times, and within one meter almost 80% of the times for a ten second recording. In both modes, linear estimation based on equation (14) was used.

Figure 6:
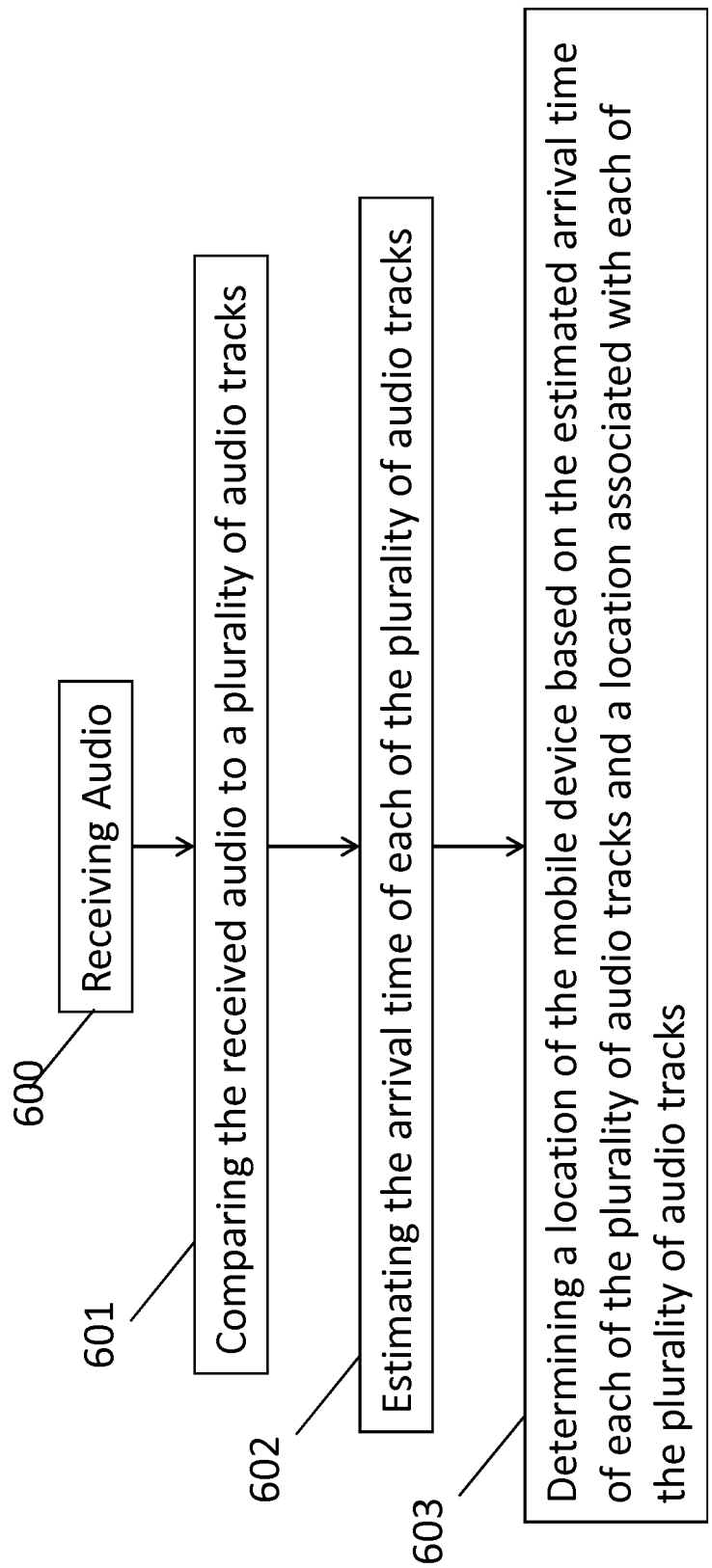
FIG. 6 illustrates a flowchart in accordance with an exemplary embodiment.

FIG. 6 illustrates a flowchart in accordance with an exemplary embodiment. A mobile device may initiate a process that includes receiving a broadcast 600; comparing the received broadcast to a plurality of audio tracks 601; estimating the arrival time of each of the plurality of audio tracks 602; and determining a location of the mobile device based on the estimated arrival time of each of the plurality of audio tracks and a location associated with each of the plurality of audio tracks 603.

Figure 7:
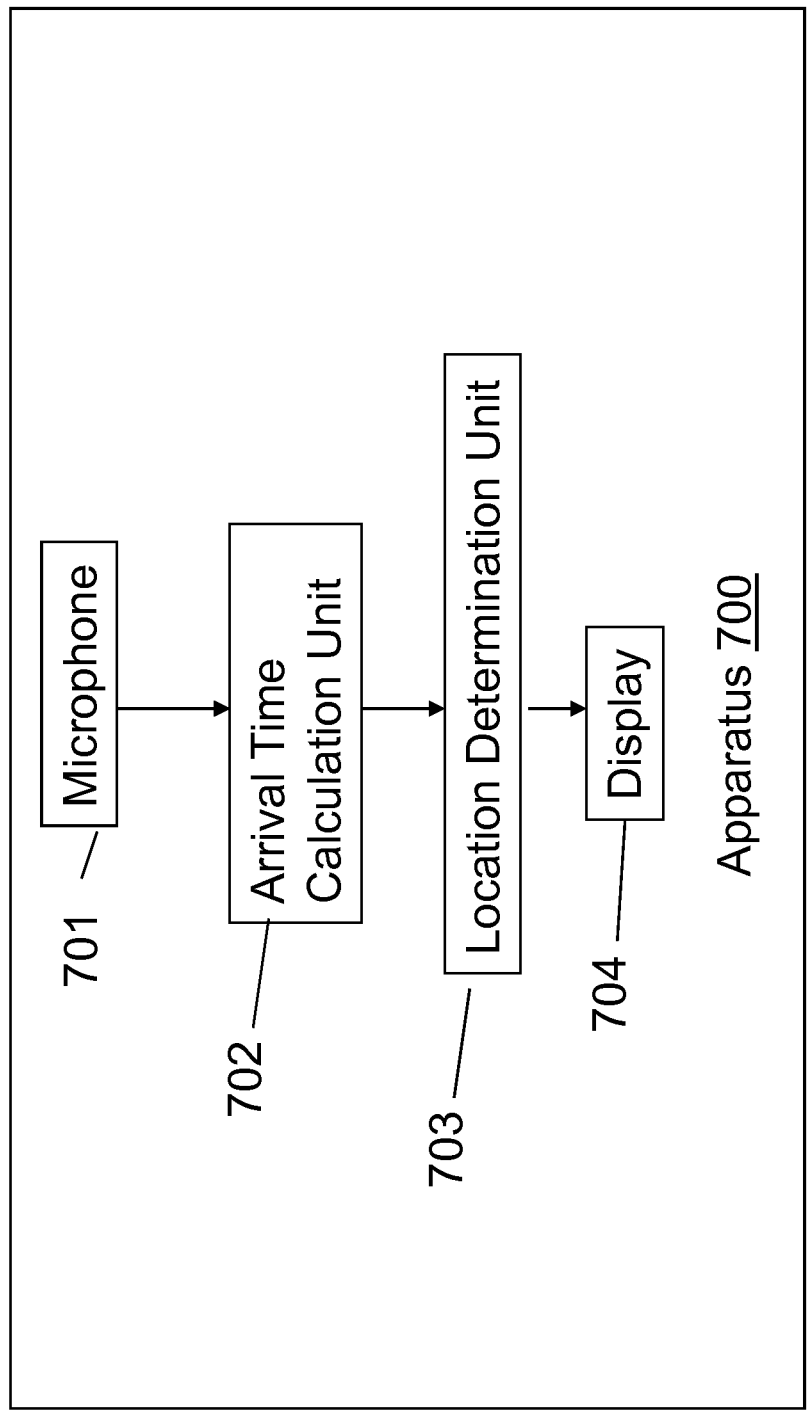
FIG. 7 illustrates a functional diagram in accordance with an exemplary embodiment.

FIG. 7 illustrates a functional diagram in accordance with an exemplary embodiment. An apparatus 700, such as a mobile device, may include a sensor such as a microphone 701 that receives a broadcast (e.g. audio, etc.); an arrival time calculating unit 702 comparing the received audio signal to a plurality of audio tracks and estimating an arrival time of each of the plurality of audio tracks; and a location determination unit 703 determining a location of the mobile device based on the estimated arrival time of each of the plurality of audio tracks and a location associated with each of the plurality of audio tracks. A display 704 may also be used to indicate the location of the mobile device on an interface, such as a map. The location, once determined, may also be made available to any other location sensitive applications running on the device.

Figure 8:
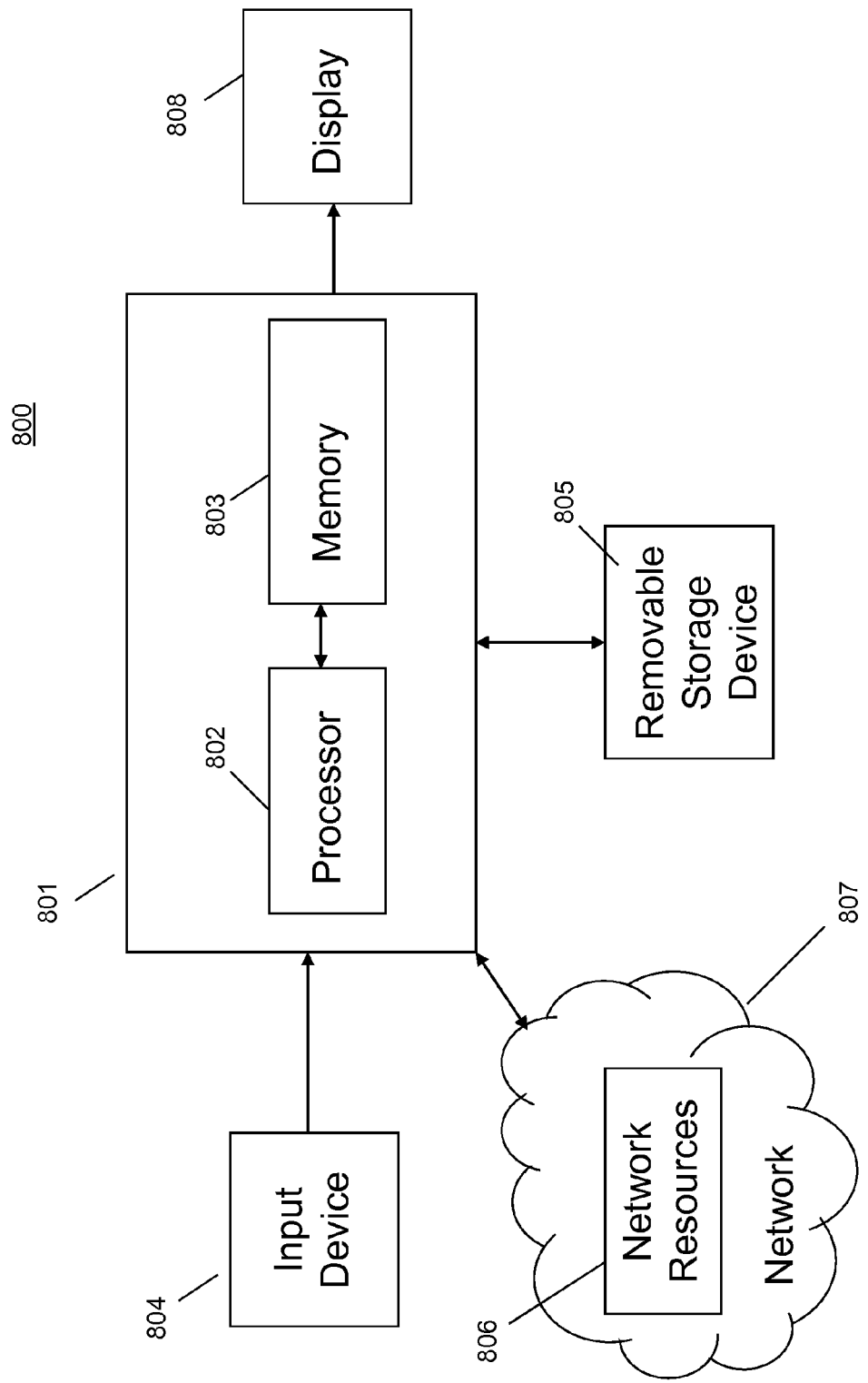
FIG. 8 is a block diagram that illustrates an exemplary computer/server system upon which an exemplary embodiment may be implemented.

FIG. 8 is a block diagram that illustrates an embodiment of a computer/server system 800 upon which an embodiment of the inventive methodology may be implemented. The system 800 includes a computer/server platform 801 including a processor 802 and memory 803 which operate to execute instructions, as known to one of skill in the art. The term "computer-readable medium" as used herein refers to any medium that participates in providing instructions to processor 802 for execution. Additionally, the computer platform 801 receives input from a plurality of input devices 804, such as a keyboard, mouse, touch device, multi-touch device, or verbal command. The computer platform 801 may additionally be connected to a removable storage device 805, such as a portable hard drive, optical media (CD or DVD), disk media or any other medium from which a computer can read executable code. The computer platform may further be connected to network resources 806 which connect to the Internet or other components of a local public or private network. The network resources 806 may provide instructions and data to the computer platform from a remote location on a network 807. The connections to the network resources 806 may be via wireless protocols, such as the 802.11 standards, Bluetooth® or cellular protocols, or via physical transmission media, such as cables or fiber optics. The network resources may include storage devices for storing data and executable instructions at a location separate from the computer platform 801. The computer interacts with a display 808 to output data and other information to a user, as well as to request additional instructions and input from the user. The display 808 may therefore further act as an input device 804 for interacting with a user.

Moreover, other implementations will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

What is claimed is:

1. A mobile device, comprising:
a sensor configured to receive an audio signal comprising at least one from among a pseudorandom sequence seed representing a periodic pseudorandom white noise and modulated music;
an arrival time calculating unit configured to compare the received audio signal to a plurality of pre-stored audio tracks and estimate an arrival time of the received audio signal comprising the at least one from among the pseudorandom sequence seed representing the periodic pseudorandom white noise and the modulated music; and
a location determination unit configured to determine a location of the mobile device based on the estimated arrival time the received audio signal comprising the at least one from among the pseudorandom sequence seed representing the periodic pseudorandom white noise and the modulated music and a location associated with each of the pre-stored plurality of audio tracks, wherein the arrival time calculating unit is configured to compare the received audio signal to the plurality of audio tracks by cross correlating the received audio signal with the plurality of pre-stored audio tracks.

2. The mobile device of claim 1, wherein the arrival time calculating unit is further configured to correct for a clock drift of the received audio signal based on the comparing.

3. The mobile device of claim 1, wherein the arrival time calculating unit receives the plurality of audio tracks from a server.

4. The mobile device of claim 1, wherein the arrival time calculating unit calculates the estimated arrival time of the each of the plurality of audio tracks by estimating a first time that a first one of the plurality of audio tracks starts playing.

5. A computer program product comprising a non-transitory computer readable medium having computer readable program code embodied therewith, the computer readable program code comprising code for:

receiving an audio signal comprising at least one from among a pseudorandom sequence seed representing a periodic pseudorandom white noise, an inaudible noise and modulated music;

comparing the received audio signal to a plurality of pre-stored audio tracks;

estimating an arrival time of the received audio signal comprising the at least one from among the pseudorandom sequence seed representing the periodic pseudorandom white noise, the inaudible noise, and the modulated music; and determining a location of a mobile device based on the estimated arrival time of the received audio signal comprising the at least one from among the pseudorandom sequence seed representing the periodic pseudorandom white noise, the inaudible noise and the modulated music and a location associated with each of the pre-stored plurality of audio tracks, wherein the comparing compares the received audio signal to the plurality of pre-stored audio tracks by cross correlating the received audio signal with the pre-stored plurality of audio tracks.

6. The computer program product of claim 5, further comprising code for correcting for a clock drift of the received broadcast based on the comparing.

7. The computer program product of claim 5, further comprising code for receiving a selection of the plurality of audio tracks for the comparing.

8. The computer program product of claim 5, wherein the code for calculating the estimated arrival time of the each of the plurality of audio tracks further comprises estimating a first time that a first one of the plurality of audio tracks starts playing.

9. A method, comprising:

receiving a broadcast comprising at least one from among a pseudorandom sequence seed representing a periodic pseudorandom white noise and modulated music;

comparing the received broadcast to a plurality of pre-stored audio tracks;

estimating an arrival time of the received broadcast comprising the at least one from among the pseudorandom sequence seed representing the periodic pseudorandom white noise and the modulated music; and determining a location of a mobile device based on the estimated arrival time of the received broadcast comprising the at least one from among the pseudorandom sequence seed representing the periodic pseudorandom white noise and the modulated music and a location associated with each of the pre-stored plurality of audio tracks, wherein the comparing compares the received broadcast to the plurality of pre-stored audio tracks by cross correlating the received audio signal with the pre-stored plurality of audio tracks.

10. The method of claim 9, further comprising correcting for a clock drift of the received audio based on the comparing.

11. The method of claim 9, further comprising receiving a selection of the plurality of audio tracks for the comparing.

12. The method of claim 9, wherein the calculating the estimated arrival time of the each of the plurality of audio tracks further comprises estimating a first time that a first one of the plurality of audio tracks starts playing.

13. The method of claim 12, wherein the calculating the estimated arrival time further comprises setting a value for a height of the mobile device.

14. The method of claim 13, wherein the calculating the estimated arrival time further comprises retaining the first time and the value to determine the location of the mobile device in a subsequent determination.

* * * * *